Nov. 1, 1955    G. W. LINDSAY    2,722,337
CLOSURE MEMBER

Filed April 23, 1953    2 Sheets-Sheet 1

INVENTOR.
GRIFFITH W. LINDSAY
BY Toulmin & Toulmin
ATTORNEYS

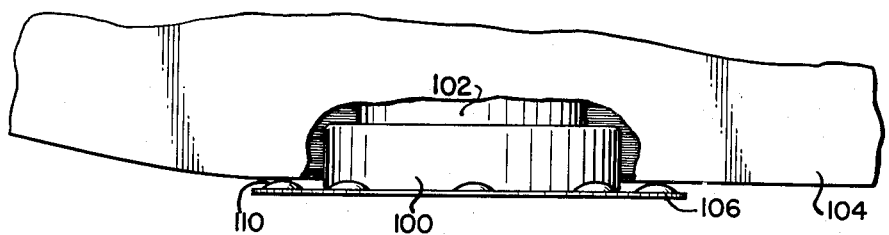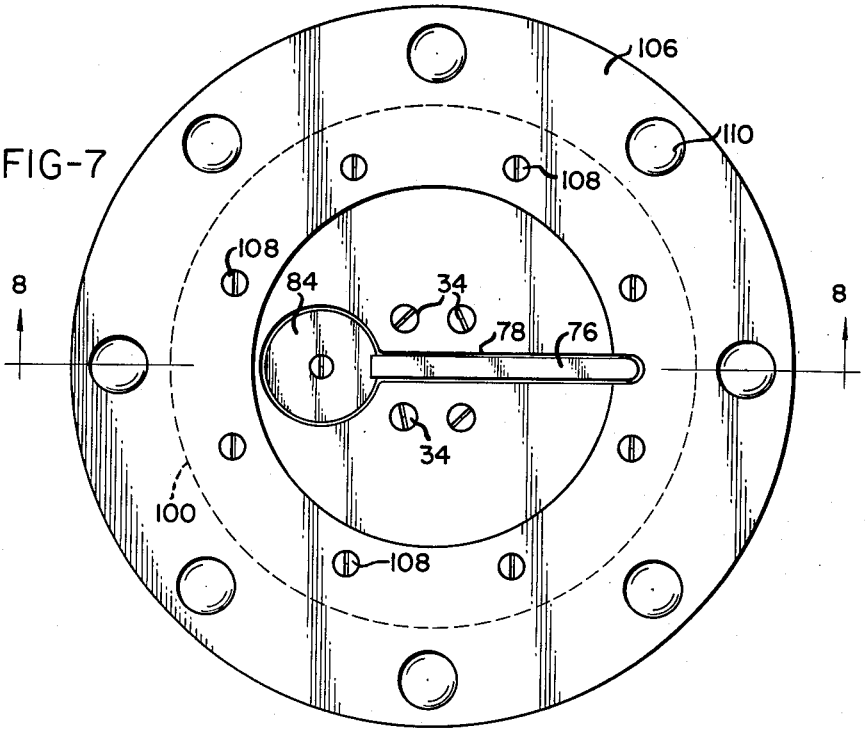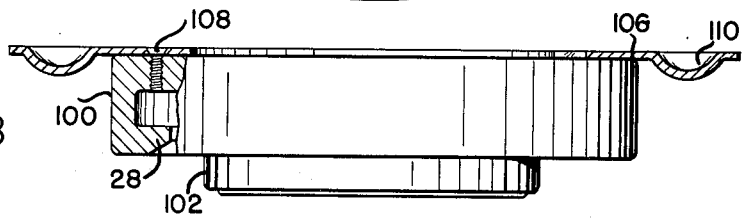

United States Patent Office 2,722,337
Patented Nov. 1, 1955

2,722,337

CLOSURE MEMBER

Griffith W. Lindsay, Dayton, Ohio, assignor to Buckeye Iron & Brass Works, Dayton, Ohio, a corporation of Ohio Application April 23, 1953, Serial No. 350,735

5 Claims. (Cl. 220—40)

This invention relates to a closure member, and particularly to a closure member especially adapted for closing the filling openings of gasoline tanks and the like.

In my copending applications, Serial Number 333,041, filed January 26, 1953, and Serial Number 333,042, filed January 26, 1953, and assigned to the same assignee as the instant application, I show, respectively, a fitting for the tank opening of an aircraft tank or the like, and an adapter member therefor, and a filling nozzle adapted for connection with the adapter and effecting the filling of the said tank.

After the tank has been filled, it is important that the filling opening be maintained tightly closed at all times so that there will be no leakage of fluid from the tank. The requirements for such a closure member are stringent, and include the ability to withstand a predetermined minimum pressure of the fluid being retained in the tank, to lock positively in place, to be capable of being placed in position under a predetermined amount of thrust and with the application of a predetermined amount of torque, and to be self-adjusting over a relatively wide range to provide for a good seal even when the closure member or the holding lugs on the filling opening become worn.

Having the foregoing in mind, it is a primary object of this invention to provide a closure member of the nature referred to which will meet the statement of requirements and which will, nevertheless, be relatively inexpensive to manufacture.

Another object of this invention is the provision of a closure member of the nature referred to in which the pressure of the fluid being retained in the tank being closed assists in effecting a seal between the opening and the closure member mounted thereon.

Another object of this invention is the provision of a closure member of the nature referred to which can be readily adapted for closing a flush mounted tank filling opening.

Another particular object of this invention is the provision of a closure member of the nature referred to which embodies a combination locking member and indicating member so arranged that the member will readily indicate whether or not the closure member is in fully closed position.

It is also an object to provide a closure member of the nature referred to which will lock in position and which cannot be accidentally removed.

The foregoing and still other objects and advantages of this invention will become more apparent upon reference to the following description, taken in connection with the accompanying drawings, in which:

Figure 6 is a view similar to Figure 1, but showing a closure member according to my invention adapted for closing a substantially flush mounted filling opening;

Figure 7 is a view looking up at the bottom of Figure 6; and

Figure 8 is a sectional view, indicated by line 8—8 on Figure 7.

Figure 1:
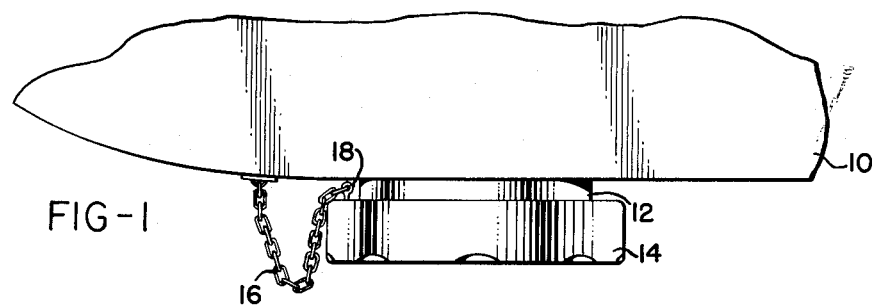
Figure 1 is a fragmentary view showing a closure member according to the present invention in position on a tank filling opening that projects outwardly from the adjacent surface.

Referring to the drawings somewhat more in detail, in Figure 1, 10 indicates a member which may comprise an aircraft wing or fuselage of such an aircraft, and in which such member there is a tank for receiving gasoline. This tank is connected with a filling opening 12 by any suitable conduit, and the filling opening 12 is adapted for being closed by the closure member 14 constructed according to the present invention. Closure member 14 may advantageously be flexibly secured to member 10 by way of cable 16, having one end anchored to closure member 14 by pin 18.

Referring now to Figures 2 to 5, the member 12 on which the closure member is mounted, and which is illustrated somewhat more in detail in my copending applications referred to above, comprises a generally cylindrical element having a radially inwardly projecting annular flange 20 positioned inwardly from its outer end and also comprising a plurality of circumferentially spaced, outwardly extending lugs 22 at the extreme outer end.

The outer end of adapter member 12 is also provided with spaced axial notches 24.

The closure member of the present invention comprises a main body part 26, having a lower inwardly projecting annular flange 28 that is notched out as indicated at 30 for receiving the lugs 22.

Secured to the center of the body part 26 by the screws 34 is a generally cylindrical part 36, which has a dependent skirt 38 surrounding a cylindrical sleeve-like portion 40 from the lower end of which there extends outwardly the flat portion 42 having the vertical axial peripheral flange 44. The member 36 is provided with spaced recesses in which are located the self-locking nuts 46 that are engaged by the screws 34, so that when member 36 is located, and the screws 34 are drawn up, member 36 becomes rigidly attached to body part 26.

Dependent skirt portion 38 of member 36 and the sleeve portion 40 thereon, are provided with cooperating annular grooves in which are located a series of small spherical balls 49 that are introduced into the space by the opening 50 in the skirt portion 38. This opening is closed after the balls have been introduced therein by an outer skirt 52 fitting closely about sleeve portion 38 and preferably having one or more tabs 54 turned inwardly into notches formed in member 36.

Disposed within sleeve portion 40 is a cylindrical neck element 56, which is upstanding from the center of a flat disc-like member 58, having an upwardly projecting peripheral flange 60 that surrounds the flange portion 44 upstanding from flat circular member 42. Advantageously, small rim 62 projects from about the upper edge of flange portion 44 to provide a stop that engages axial flange 60 when disc member 58 is moved upwardly.

Figure 3:
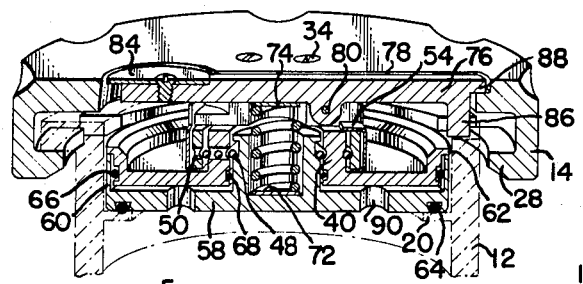
Figure 3 is a perspective sectional view indicated by line 3—3 on Figure 2, showing the cap in position on the adapter member of the tank filling opening with the said adapter member shown in phantom outline.
Figures 2, 4:
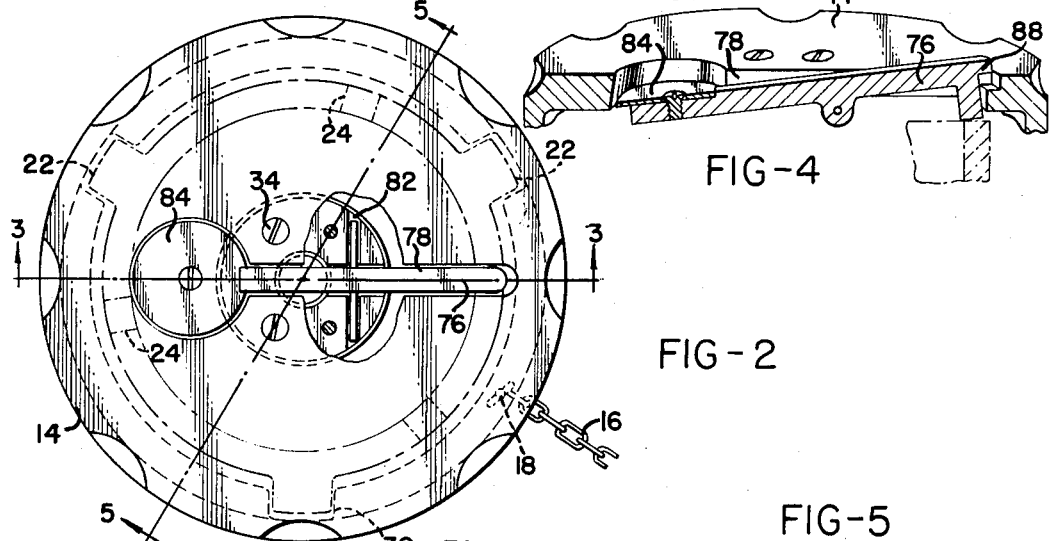
Figure 2 is a plan view looking up from the bottom of Figure 1, showing the closure cap with a portion thereof broken out to show some of the details of the construction thereof.
Figure 4 is a perspective view similar to Figure 3, but less in detail, showing the position occupied by the combination locking and indicating member when the closure member is not fully closed.
Figure 5:
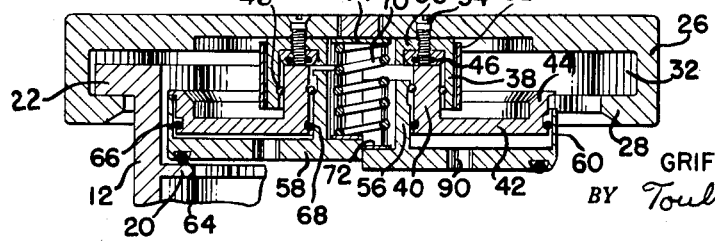
Figure 5 is a transverse sectional view through the closure member, indicated by line 5—5 on Figure 2, and with the left half of the view showing the position occupied by the several parts of the closure member when it is in position on the adapter member and with the right sides of the view showing the positions occupied by the said parts when the closure member is removed.

As will be seen in Figures 3 and 5, the bottom surface of disc 58 is annularly grooved to receive a resilient rubber-like O-ring 64 that engages flange 20 of the adapted member to effect sealing engagement therewith.

Similarly, the outer periphery of the circular flat member 42 is annularly grooved to receive a resilient rubber-like O-ring 66 that seals against flange portion 60. Still another annular rubber-like O-ring is located at 68 between cylindrical portion 56 and cylindrical portion 40.

The disc member 58 is urged downwardly from body portion 26 by a compression spring 70 that bears between a plate 72 at the bottom of a recess in cylindrical neck portion 56 of disc member 58 and a plate 74 that is positioned against the underside of the top part of body part 26.

Spring 70 is also availed of for urging the latch and indicator element 76 toward its latching position. This element lies in a transverse slot 78 in the body part 26 of the closure member, and is mounted on a pin 80 that extends laterally from element 76 into the slots 82 formed in member 36. One end of element 76, the left end as viewed in Figure 3, carries a finger piece 84, so that the element can be rotated about its pivotal support. The other end of the element comprises the nose 86 adapted for entering one of the notches 24 in the end of the adapter member and the abutment porton 88 that engages a shoulder on the body part of the closure member to limit the rotation of element 76 about its pivotal support.

The pin 18 is availed of to provide a stop for stopping the closure member in the proper position by being mounted in the body part 26 thereof so as to extend across recess 32 in which lugs 22 are received in such a position that the pin will abut one of the lugs at the same time that the locking element aligns with one of the notches 24.

In operation, the closure member is placed in position on the adapter member so that the lugs of the adapter member register with the notches 30 of the closure member. The annular O-ring 64 will abut flange 20 before the lugs will register with the recess 32, and at this time an axial pressure must be exerted on the body part 26, which will effect compressing of spring 70. When the body part 26 has been moved over the adapter far enough that the lugs 22 can be received in recess 32, the said body part is then rotated to a stopped position, and at which time the locking or latching element 76 will fall into a notch. It will be noted that the pressing of the body part of the closure member, preparatory to the turning thereof was operable to cause movement of the locking or latching member to its Figure 4 position, and it will also be ascertained that the closure member could be placed into position with less exertion by utilizing finger piece 84 to move the locking or latching element to its Figure 4 position.

In either case it will further be apparent that the element 76 will provide a clear indication of improper positioning of the closure member, because until the element 76 falls into a notch, it will project outwardly from body part 26 of the closure member in a readily discernible position which can even be readily detected in the dark.

The relative axial movement between the main portion of the closure member and the disc part 58 is accomplished by the cylindrical projection 56 having the groove on the outside thereof that receives the balls 48 of sufficient length to permit this relative axial movement.

A still further feature of my invention is the provision of the ports 90 in disc part 58 which permit the pressure that is being retained within the tank, by the placing of the closure member on the adapter member, to enter the space between disc part 58, and the flat member 42.

Since the area of the inner face of the disc 58 is greater than the outer area thereof a force will be exerted to effect a sealing between the disc 58 and the flange 20. Pressure against the pressure plate 42 will effect a sealing between the plate 42 and the disc part 58.

In the modification illustrated in Figures 6 through 8, I show how the closure member of the present invention can be so constructed to form substantially a flush mounting when in position. In these figures, the closure member itself is indicated at 100, and the adapter fitting on which it is mounted is designated 102. The member containing the tank, and within which adapter member 102 is mounted, is indicated at 104. In this modification, the closure member 100 is provided with an annular ring member 106 secured thereto by the screws 108, and comprising a plurality of circumferentially spaced dimples 110 or the like, which bear on the undersurface of the member 104 when the closure member is in position. The provision of the dimpled ring 106 provides for closing of the opening in member 104, through which closure member 100 extends, and the dimpled ring itself bears perpendicularly against member 104, but with little friction. At the same time the dimples 110 provide finger recesses so that the operator of the closure member can obtain good purchase thereon. In all other respects, the modification of Figures 6 through 8 is identical with the one illustrated in Figures 1 through 5.

By way of a specific example of one form of closure member and the manufacturing and operative characteristics that must be met thereby, the closure member, as illustrated, must be receivable on the adapter and pushed into position so that the lugs 22 of the adapter align with the annular recess 32 of the closure member with not more than a twenty-five pound thrust. Thereafter, the closure member must be rotatable in locked position with the application of not more than fifty pounds inches of torque, and the closure member so applied must be capable of retaining, without leakage, pressure up to one hundred eighty pounds per square inch.

The closure member, according to this invention equals or excels the requirements referred to above, and likewise has the several advantageous features that have been referred to.

It will be understood that this invention is susceptible to modification in order to adapt it to different usages and conditions, and, accordingly, it is desired to comprehend such modifications within this invention as may fall within the scope of the appended claims.

I claim:

1. In a closure member of the nature described; a disc-like body part having a dependent peripheral flange with its lower end turned in and provided with axial slots, a member secured inside said body part at the center and comprising a dependent peripheral skirt, a pressure plate having a sleeve extending inside said skirt, a disc having a neck inside said sleeve and an upstanding outer perihperal flange portion telescoping the periphery of said pressure plate, means rotatably securing said skirt and sleeve together and rotatably and reciprocably connecting said neck and sleeve together, sealing means between said neck and sleeve and between said pressure plate and the marginal portion of said disc, sealing means extending annularly about said disc on the side thereof opposite the pressure plate, and apertures in said disc for admitting pressure to the space between said disc and pressure plate.

2. In a closure member of the nature described; a disc-like body part having a dependent peripheral flange with its lower end turned inwardly and provided with spaced axial slots to form one element of a bayonet type connector, a member secured in said body part in the center thereof having a dependent skirt, a pressure plate in said body part having a sleeve portion extending into said skirt, a disc below said pressure plate having a neck extending into said sleeve portion and having an axial marginal portion telescoping the periphery of said pressure plate, annular grooves on the inside of said skirt and on the inside and outside of said sleeve portion, an annular groove on said neck, means for introducing balls into said grooves for rotatably connecting said disc, pressure plate, and sleeve, a spring urging said disc downwardly relative to said body part, said balls having a diameter less than the width of the annular groove in said neck, sealing means between said neck and sleeve portion and between the said axial marginal portion of said disc and periphery of said pressure plate, annular means on the side of the disc opposite the pressure plate to engage a flange in sealing relation, and apertures in said disc inwardly of said annular means for admitting pressure into the space between pressure plate and disc.

3. In a closure member of the nature described; a disc-like body part having a dependent peripheral flange with its lower end turned in and provided with spaced axial slots, a member secured to the inside of said body part in the center and having a dependent skirt, a pressure plate in said body part having a sleeve portion telescoping said skirt, a disc under said pressure plate having a neck projecting from the back thereof telescoping said sleeve portion, said disc having an upwardly extending marginal flange telescoping the periphery of said pressure plate, means rotatably connecting said skirt, sleeve portion and neck for relative rotation of said disc, pressure plate, and body part, while permitting limited relative axial movement between said disc and pressure plate, sealing means between said neck and sleeve portion and between the periphery of said pressure plate and the marginal axial flange on said disc, a sealing element carried on the underside of said disc adjacent the periphery thereof, ports in the disc for admitting pressure to the space between the disc and plate, and a compression spring acting between said body part and said disc.

4. In a closure member of the nature described; a disc-like body part having a dependent peripheral flange with its lower end turned in and provided with spaced axial slots, a member secured to the inside of said body part in the center and having a dependent skirt, a pressure plate in said body part having a sleeve portion telescoping said skirt, a disc under said pressure plate having a neck projecting from the back thereof telescoping said sleeve portion, said disc having an upwardly extending marginal flange telescoping the periphery of said pressure plate, means rotatably connecting said skirt, sleeve portion and neck for relative rotation of said disc, pressure plate, and body part, while permitting limited relative axial movement between said disc and pressure plate, sealing means between said neck and sleeve portion and between the periphery of said pressure plate and the marginal axial flange on said disc, a sealing element carried on the underside of said disc adjacent the periphery thereof, ports in the disc for admitting pressure to the space between the disc and plate, and a compression spring action between said body part and said disc, said means rotatably connecting said neck, sleeve portion, and skirt comprising annular grooves therein and balls in said grooves, said skirt and sleeve portion being radially drilled for introducing the balls into said grooves, and means surrounding said skirt for retaining said balls in position.

5. In a closure member adapted for mounting on the filling neck of a tank or the like, said neck comprising spaced radial lugs at the end on the outside and an internal shoulder spaced inwardly from the end, a body part having a dependent peripheral flange slotted for receiving said lugs and an annular recess to receive the lugs after they pass through said slots, a disc reciprocably carried by said body having sealing means to engage said shoulder, spring means urging the disc away from the body part so the disc will engage the shoulder before the lugs register with said recess whereby said spring means is loaded when the lugs register with the recess and turning of the body part thereafter will effect connecting of the closure member with the neck, said neck having an axial notch in the end, a transverse slot in said body part, a latch element in the slot pivoted about its center to the body part and having a nose projecting into the body part to engage the end of said neck, said spring means also acting on said latch element to urge the nose thereof inwardly of said body part, and said element being so located as to register with said notch to lock said closure member against rotation when the said lugs are located between said slots, the outer surface of said latch member being flush with the outer surface of said body part only when said closure member is locked against rotation.

References Cited in the file of this patent

UNITED STATES PATENTS

| 1,176,989 | Rogers et al. | Mar. 28, 1916 |
| 1,369,646 | Fuller | Feb. 22, 1921 |
| 2,102,962 | Ludington | Dec. 21, 1937 |
| 2,179,136 | Shoemaker | Nov. 7, 1939 |
| 2,316,923 | Westberg | Apr. 20, 1943 |
| 2,480,692 | Anthony | Aug. 30, 1949 |
| 2,581,536 | Johns | Jan. 8, 1952 |
| 2,581,537 | Maisch | Jan. 8, 1952 |
| 2,597,576 | Donovan | May 20, 1952 |
| 2,616,584 | Rausenberger et al. | Nov. 4, 1952 |
| 2,675,939 | Fraser | Apr. 20, 1954 |

FOREIGN PATENTS

| 378,116 | France | Sept. 25, 1907 |
| 302,787 | Great Britain | Dec. 27, 1928 |